No. 887,962. PATENTED MAY 19, 1908.
H. REISNER.
BUNG BUSHING FOR CASKS.
APPLICATION FILED JULY 5, 1907.

WITNESSES
J. W. Pettersson
Jac. Maier

INVENTOR
Hermann Reisner
by Robt. Klotz
Atty.

THE NORRIS PETERS CO., WASHINGTON, D. C.

UNITED STATES PATENT OFFICE.

HERMANN REISNER, OF CHICAGO, ILLINOIS.

BUNG-BUSHING FOR CASKS.

No. 887,962.  Specification of Letters Patent.  Patented May 19, 1908.

Application filed July 5, 1907. Serial No. 382,210.

*To all whom it may concern:*

Be it known that I, HERMANN REISNER, a citizen of the United States, and residing at Chicago, in the county of Cook and State of Illinois, have invented a new and useful Improvement in Bung-Bushings for Casks, of which the following is a complete specification.

This invention relates to improvements in bung bushings for casks and more particularly to a bushing provided with means adapted to securely lock it in place.

Heretofore difficulty has been encountered in having the bung bushings of casks, such as used for beer and like products, working loose, due to the continuous rough handling to which the casks are subjected.

It is the object of this invention therefore, to provide a bushing having means thereon adapted to easily indent the side of the cask, when inserted, but which will grip into the wood or other cask material when the bushing starts to retract for any reason.

It is a further object of the invention to provide a bung bushing having a recess in its flange in which is carried a packing of any suitable material adapted to securely seal the joint between the sleeve of the bushing and the cask.

The invention consists of the matters hereinafter described in the specification and more fully pointed out and defined in the appended claims.

Figure 1:
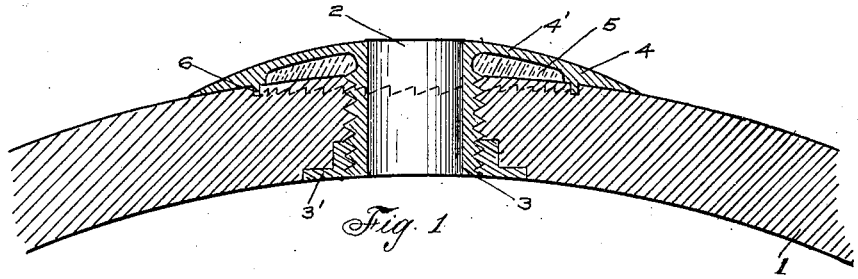
Figure 2:
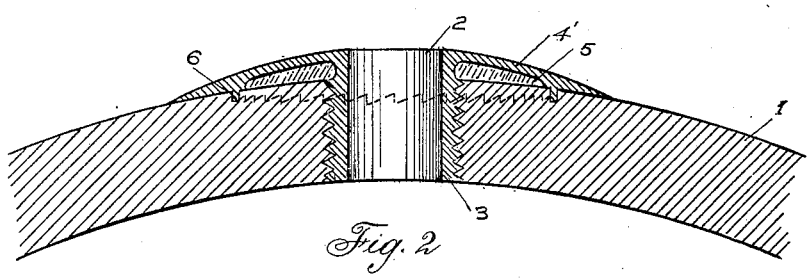
Figures 3, 4, 5:
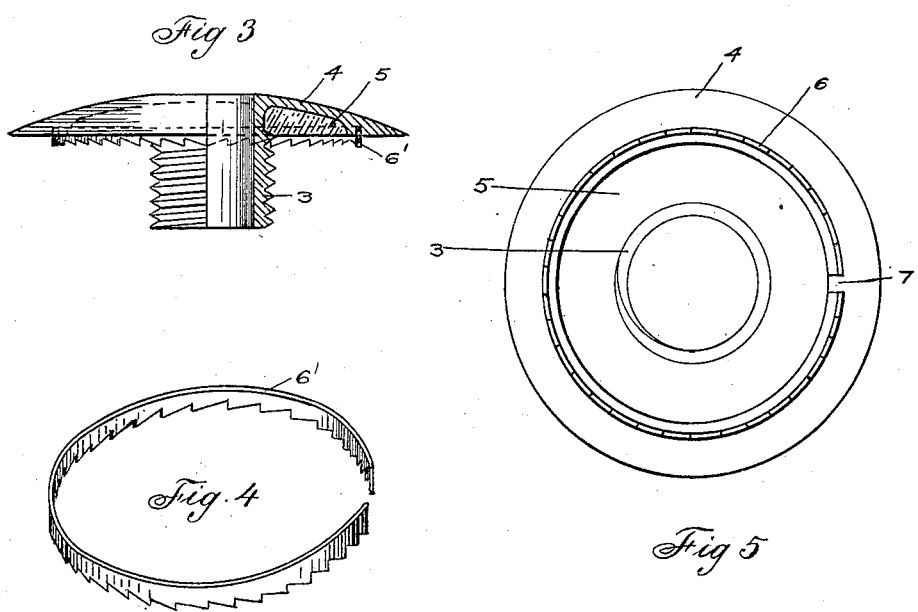

In the drawings: Figure 1 is a fragmentary section of a cask and showing in vertical section a bung bushing embodying my invention. Fig. 2 is a view similar to Fig. 1 but showing a different method of securing the bushing in the cask. Fig. 3 is a view of the bushing, partly in side elevation and partly in vertical section, and showing a detachable toothed rim. Fig. 4 is a perspective view of the toothed rim shown in Fig. 3. Fig. 5 is a bottom plan view of the bushing shown in Fig. 3.

As shown in said drawings: 1 indicates the cask and 2 indicates the bushing as a whole, which may be of any preferred construction and material, preferably of metal. Said bushing, as shown, comprises an externally threaded sleeve 3 adapted for threaded engagement in the bung hole of the cask, which, as shown in Fig. 1, is provided on its inner side with a flanged nut 3', countersunk in the cask and adapted to receive said sleeve. On the outer end of said sleeve is a broad flange 4, having on its under side a recess 4' in which is engaged a packing 5 of any desired material such as soft rubber and which is adapted to be firmly pressed against the cask when the bushing is secured in place. On the under side of said flange 4 and concentric with the sleeve 3 is a downwardly directed, serrated rim 6, the teeth of which are directed rearwardly of the direction in which the bushing is rotated to insert it in the bung hole of the cask. As shown in Figs. 1 and 2, said rim is formed integrally with the flange of the bushing. It may however be formed separately as shown in Figs. 3 to 5 inclusive, in which case the flange is provided on its under side with a groove, concentric with the sleeve and in which is rigidly but removably engaged a band 6' having a serrated edge as before described. As shown more clearly in Fig. 5 the groove is not continuous, but a shoulder 7 is left against which the ends of the band abut to prevent the bushing being turned independently of the band.

The operation is as follows: As shown the bushing is screwed into the bung hole of the cask and the packing 5 is brought into firm contact with the cask about the hole, thereby securely closing the joint. Inasmuch as the packing is carried in a recess in the flange of the bushing it is always ready for use and obviates the necessity of separately handling the packing. As the bushing approaches its inner limit of movement in the bung hole, the serrated rim is forced into the wood of the cask and inasmuch as its teeth are directed rearwardly of the direction of rotation they tend to slip over the grain of the wood and indent it rather than cut it. The grain tends to spring back to place between the teeth thereby securely locking the bushing against any tendency to reverse movement due to handling the cask.

Obviously the serrated rim may be made integral with the bushing or separately therefrom as preferred, and the teeth thereof may be sprung slightly laterally if desired to more efficiently grip the wood.

I claim as my invention:

1. In a device of the class described the combination with an externally threaded sleeve of a laterally directed flange thereon having a recess in its under side, a resilient packing securely engaged in said recess and a downwardly directed rim intermediate the edge of the flange and said recess and having serrations on its under edge.

2. In a device of the class described the combination with an externally threaded sleeve of a peripheral flange thereon and a downwardly directed rim on said flange concentric with the sleeve, and having teeth on its under edge directed rearwardly of the direction of rotation of the sleeve when being secured in place.

3. In a device of the class described the combination with an externally threaded sleeve of a flange thereon having a recess in its under side, a packing rigidly engaged on the under side of said flange concentric with the sleeve, and a serrated rim on the under side of said flange removably engaged in said recess.

4. In a device of the class described the combination with a sleeve of a peripheral flange on one end thereof, having a recess in its under side, and a serrated band rigidly but removably engaged in said recess and projecting downwardly from the flange.

In testimony whereof I have hereunto subscribed my name in the presence of two witnesses.

HERMANN REISNER.

Witnesses:
J. W. PETTERSSON,
JOE WINKLHÖFER.